Dec. 22, 1964    J. G. M. J. DE WOUTERS D'OPLINTER    3,162,106
WATER-TIGHT PHOTOGRAPHIC CAMERA
Filed Jan. 16, 1961

*INVENTOR*
JEAN GUY MARIE JOSEPH DE WOUTERS D'OPLINTER

BY Stevens, Davis, Miller & Mosher

ATTORNEYS 3,162,106
WATER-TIGHT PHOTOGRAPHIC CAMERA
Jean Guy Marie Joseph de Wouters d'Oplinter, Roque-
fort-les-Pins, France, assignor to La Spirotechnique,
Paris, France
Filed Jan. 16, 1961, Ser. No. 82,927
Claims priority, application France, Jan. 27, 1960,
816,882, Patent 1,255,466
4 Claims. (Cl. 95—11)

The invention relates to a water-tight photographic camera which can be used just as well when submerged beneath the water as under the other conditions in which any photographic camera is normally employed.

According to its most general feature, the photographic camera according to the invention is characterized in that its water-tight casing is formed by the camera housing itself, eliminating any water-tight casing externally of the camera.

The new camera thus obviates the well-known disadvantages of the water-tight housings generally employed when the camera is below the water and which consist in a water-tight casing surrounding a camera of any conventional design. These external casings considerably increase the bulk of the camera, require delicate operations for inserting the camera therein and in particular for connecting the camera-operating members to the control members which are accessible on the outside of the casing. In addition, the connection of these controls introduces unavoidable and frequently excessive play.

The camera according to the invention is water-tight, mist-tight and dust-tight under all circumstances. Its tightness is obtained without introducing any additional play into the control members and the size is scarcely larger than that of a conventional camera of the same format.

According to one embodiment, the water-tight camera according to the invention consists essentially of a tank-shaped housing or body and a unit assembly insertable into the said body and comprising particularly the photographic chamber, the shutter, the film-winding mechanism, the control members and viewfinder elements, this assembly being fast with a cover adapted to the opening of the body this cover being surrounded by at least one resilient joint bearing in a tight manner against the internal wall of the body, and the control members being accessible through water-tight openings on the external face of the cover or lid.

The opening of the body could for example be provided in the upper part when the camera is adapted to be used in the manner of a conventional 24×36 mm. camera. It can also be disposed in the lower part in order to permit the fitting in the bottom of the body of a viewfinder of the "single lens reflex" type, visible through a transparent window formed in the bottom of the body.

The camera according to the invention is very easily and suitably adapted to the use of a water-tight interchangeable objective mount, such as for example that which is described in my co-pending application Serial No. 750,509 filed July 23, 1958, now Patent No. 3,001,462.

To this end, one preferred embodiment of the water-tight camera according to the invention is characterized by the following features, separately or in any combination:

(a) the body has a substantially circular frontal aperture in which a water-tight interchangeable objective mount is engaged in water-tight manner.

(b) the objective is mount is provided with fixing members engaging with the photographic chamber through the frontal opening of the body, and resilient sealing means bearing on the said body, the effect of this arrangement being to maintain an invariable distance between the objective and the base of the photographic chamber, whatever may be the deformation of the housing, due particularly to the pressures experienced when submerged under water.

(c) the internal wall of the body is provided on either side of the front opening with grooves into which extend tongues fast with the internal wall of the photographic chamber, thereby forming a light baffle, these grooves having a depth greater than the height of the tongues in order to permit a certain deformation of the housing while ensuring the liquid-tightness of the photographic chamber.

(d) the movable fixing or securing means of the objective mount on the chamber also constitutes a locking member preventing the withdrawal of the mechanism unit from the body while the objective mount is in position.

(e) the objective mount comprises an external barrel adapted to be applied to the external wall of the housing and an internal barrel sliding resiliently in the external barrel, the internal barrel being provided with arcuate lugs extending into the frontal opening of the housing and being adapted to engage with the internal wall of the chamber by rotation of the mount.

(f) the camera body comprises, at least internally, a slight degree of conicity in order to facilitate the introduction of the assembly which is fast with the cover, and in order to facilitate the manufacture of the said body moulding it as a single piece without having to use a removable core.

Referring to the accompanying drawing, which is given by way of example:

Figure 1:
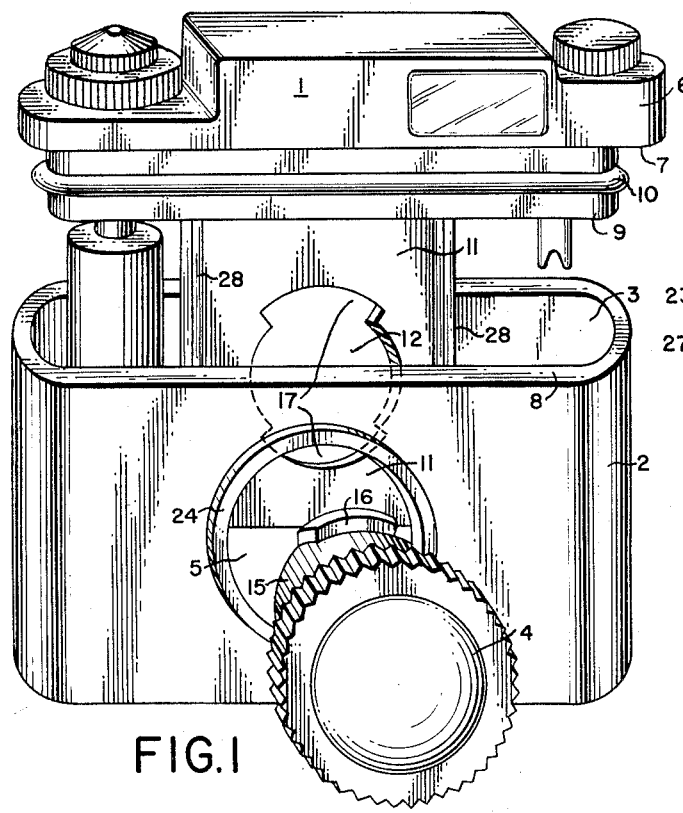
FIGURE 1 is a diagrammatic perspective view of a camera according to the invention.

FIGURE 1 shows the camera in the open position, the mechanism unit being half introduced into the body 2 through the opening 3 provided at the upper end of the body. The figure also shows diagrammatically the objective 4 ready to be inserted into the frontal opening 5 of the body. The mechanism unit 1 is completely fast with a cover or lid 6, on the upper wall of which are arranged the viewfinder and also the various conventional control members. A shoulder 7 of the cover is adapted to bear on the upper rim 8 of the body, while the part 9 of the cover situated immediately beneath the shoulder 7 is adapted to fit accurately against the internal wall of the body, the complete tightness between the cover and the body being ensured by a resilient joint 10, which completely surrounds the part 9 of the cover fitting into the body. Preferably, the joint 10 is a rubber sealing ring of circular or substantially circular section partially engaged in a groove of rectangular section formed at the periphery of the lower part 9 of the cover.

Beneath the cover and fast with the latter is the photographic chamber, the front cross-hatched surface of which is visible at 11, as well as the mountings for the film spools, disposed on either side of the chamber in the usual manner.

Figure 3:
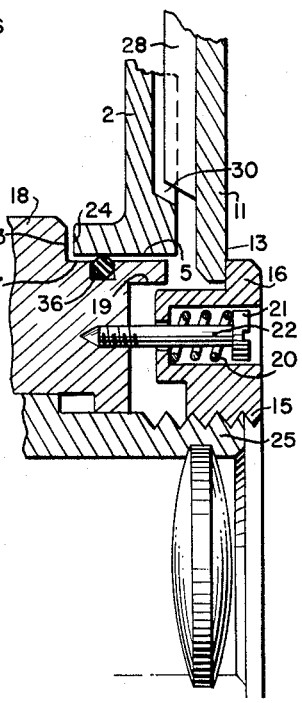
FIGURE 3 is a partial diametrical section of the means for resiliently securing the objective assembly on the camera.
Figure 2:
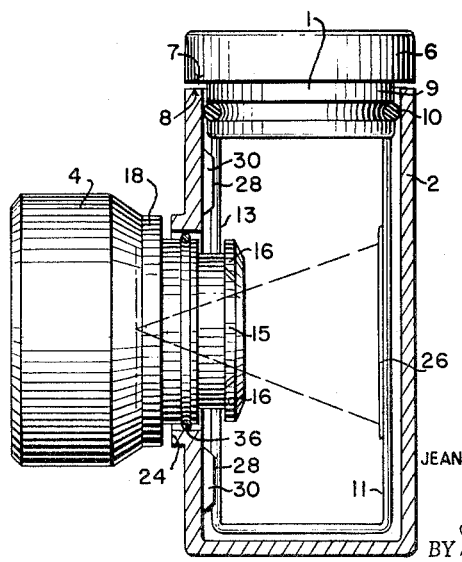
FIGURE 2 is a diagrammatic transverse section along the vertical means plane of the objective and of the photographic chamber.

In the constructional form illustrated, the front face 11 of the photographic chamber is formed with an aperture 12 adapted to be positioned in registry with the frontal opening 5 of the body, which is slightly larger than the opening 12, so as to permit passage of the movable securing means of the water-tight objective mount 4. This objective mount and its securing means have been described in detail in the patent application referred to hereinabove. FIGURES 2 and 3 of the drawing show an embodiment which is particularly adapted to be employed in combination with the water-tight camera according to the invention. In this new combination, the fixing means for the objective mount likewise forms a locking device for preventing the withdrawal of the mechanism unit from the body while the objective is in position. To this end, the objective mount 4 comprises a ring 15 provided with two diametrically opposed sectors 16 which have a width slightly smaller than 90°. These two sectors 16 may be inserted into recesses 17 of the same shape formed in the periphery of the frontal aperture 12 of the photographic chamber. When the sectors 16 are inserted in the recesses 17, a rotation through 90° enables them to be secured in the photographic chamber. The ring 15 is axially movable in a resilient manner inside the barrel 18 of the objective mount, in which it is guided for example by an internal shoulder 19 of the said barrel, and is urged resiliently by helical springs 20 each compressed between the ring 15 and the head 21 of a screw 22 screwed home in the barrel 18. This barrel is also provided with an external shoulder 23 adapted to abut against a circular flange 24 bordering the frontal opening 5 of the body so as to compress the springs 20 and to cause the sectors 16 of the ring 15 to be locked against the internal surface 13 of the front wall 11 of the photographic chamber by means of the said springs, this internal surface forming the optical reference surface permitting of an invariable distance to be maintained between the optical system, connected to the ring 15 by a helical focusing cam 25, and the image-forming plane, which is shown diagrammatically at 26 in the back of the photographic camera (FIGURE 2). Even if the camera body 2 is subjected to appreciable deformation, for example during a dive to great depth, the ring 15 would remain applied to the reference surface 13, which remains at a constant distance from the image-forming plane.

The tightness between the barrel 18 and the body 2 is for example ensured by means of a toric joint 36 enclosing the surface 27 of the barrel which is fitted into the frontal opening 5 of the body.

Referring once again to FIGURE 1, it will be seen that the front face 11 of the photographic chamber carries vertical tongues 28 on either side of its frontal aperture 12. These tongues are adapted to engage in corresponding grooves 29 formed in the internal wall of the body 2, thereby forming a light baffle, the engagement being partially shown at 30 in FIGURE 2. The depth of the grooves 30 is slightly greater than the height of the tongues 28, so as to permit a certain possible deformation of the body 2 when immersed at a great depth without compromising the light-tightness of this assembly.

In FIGURES 1 and 2, the body 2 is shown to have a slight degree of conicity, the upper opening 3 being slightly larger in all directions than the bottom of the body. This arrangement facilitates the introduction of the mechanism unit into the body and also facilitates the manufacture of the latter by moulding from a single element without having to use detachable cores.

The figures of the accompanying drawing have been shown in diagrammatic form in order to facilitate understanding thereof, and it will be appreciated that the camera which has just been described comprises all the usual members which have not been shown in the drawing or so far mentioned in the specification, such as the shutter and its setting lever, and where necessary, the accessories normally incorporated into high-class photographic cameras, such as a range-finder, photoelectric cell and other accessories. The diaphragm control and objective focusing mechanisms which have not been described could for example be incorporated into the watertight objective mount, for example in the manner described in my above-mentioned co-pending application S.N. 750,509. It is quite obvious that without departing from the scope of the present invention, it would be possible to make use of the present disclosure in various types of photographic and cinematographic cameras, and also television cameras and other water-tight optical equipment.

What I claim is:

1. A watertight photographic apparatus comprising, a trough-shaped case, a separable lid assembly and a separable objective assembly, said case having an elongated base with rounded ends, a first aperture opposite said base, of substantially the same extension and shape as said base, for receiving the lid assembly, and a second aperture for receiving the objective assembly in one of the sides of the case extending from said base to said first aperture, said lid assembly comprising a closure member mating closely with the inner edge of said aperture, said closure member being provided with a peripheral groove and an O-ring in said groove in watertight relationship with the inner wall of the case, said lid assembly further comprising a photographic chamber having a light aperture in registry with said second aperture of the case, mobile parts on the inner side of said closure member, and control members for said mobile parts on the outer side of said closure member, respectively connected to said mobile parts by stems extending through said closure member in watertight relationship therewith.

2. A watertight photographic apparatus comprising, a trough-shaped case, a separable lid assembly adapted for being inserted through a first aperture into said case, and a separable objective assembly adapted for being inserted through a second circular aperture in the front wall of said case, said lid assembly comprising a photographic chamber having a front wall spaced from the front wall of said case and a light-admitting aperture in registry with said second aperture of the case, said objective assembly comprising an outer barrel provided with a shoulder abutting against the case outer wall around said circular aperture of the case and with a terminal portion mating with the bore of said aperture, said terminal portion being provided with a peripheral groove and an O-ring in said groove, forming a watertight seal with said bore, said objective assembly further comprising a lens resiliently slidable in said barrel, and fastening means on said lens tube, engageable through said circular aperture of the case and through said light aperture of the photographic chamber, said fastening means being biased by the resilient connection between said lens tube and said barrel for bearing against the inner wall of said photographic chamber around said light aperture of the chamber.

3. A watertight photographic apparatus according to claim 2, in which the means for fastening the objective assembly to the photographic chamber comprise a plurality of arcuate lugs distributed around the lens tube and cut-out sectors formed in the front wall of the photographic chamber around the light aperture of said chamber, said cut-out sectors corresponding respectively with said lugs and forming passage for the insertion of said lugs into the photographic chamber, said cut-out sectors alternating with solid sectors of said front wall adapted for retaining said lugs upon rotation of the objective assembly.

4. A photographic apparatus according to claim 2, in which longitudinal mating grooves and tongues are provided respectively on the inner wall of the case and on the outer wall of the photographic chamber around the light aperture of said chamber, said grooves and tongues being in alignment with the sense of insertion of the photographic chamber into the case, the depth of said grooves being greater than the height of said tongues by an amount approximately equal to the spacing between the front wall of said chamber and the adjacent wall of the case.

References Cited in the file of this patent

UNITED STATES PATENTS

| | | |
|---|---|---|
| 1,331,627 | Dilts | Feb. 24, 1920 |
| 2,487,868 | Grigsby | Nov. 15, 1949 |
| 2,794,944 | Laval | June 4, 1957 |
| 2,872,622 | Edgerton | Feb. 3, 1959 |
| 2,883,919 | Jayet | Apr. 28, 1959 |
| 2,944,474 | Dennis | July 12, 1960 |